Feb. 18, 1969     G. L. MATTHAEI     3,428,922
MODE TRAP BAND-PASS FILTERS
Filed Oct. 9, 1964
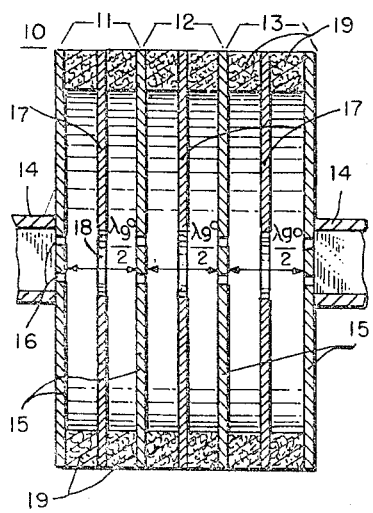
FIG. 1
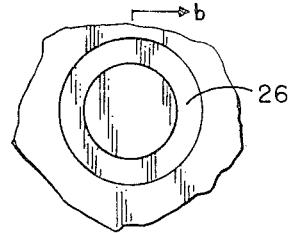
FIG. 4a    FIG. 4b
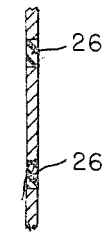
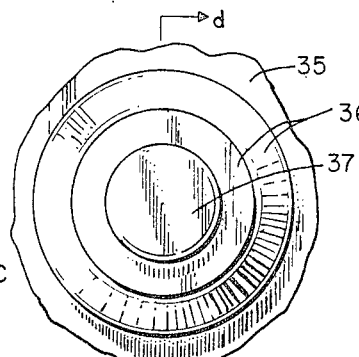
FIG. 4c
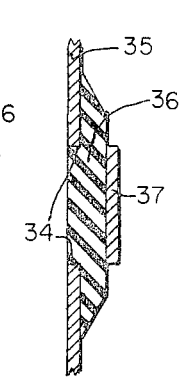
FIG. 4d
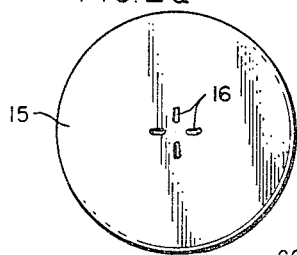
FIG. 2a
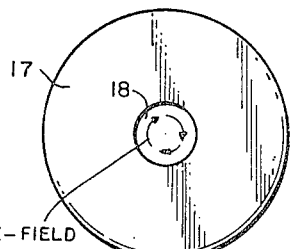
E-FIELD CONFIGURATION FOR $TE_{011}$ MODE    FIG. 2b
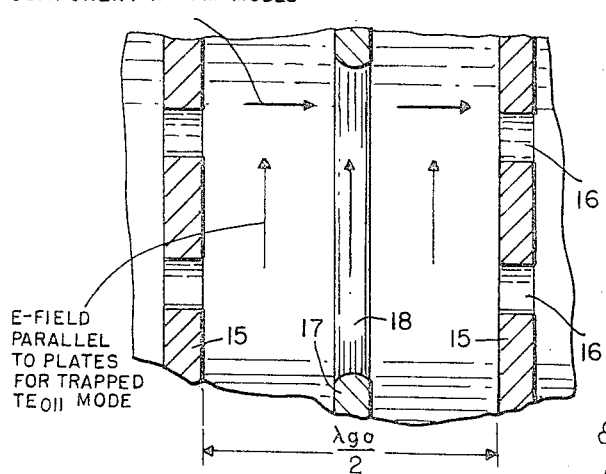
FIG. 3
PERPENDICULAR E-FIELD COMPONENT IN TM MODES
E-FIELD PARALLEL TO PLATES FOR TRAPPED $TE_{011}$ MODE
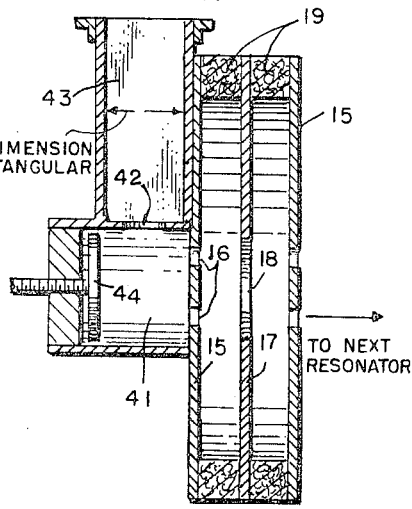
FIG. 5
WIDE DIMENSION OF RECTANGULAR GUIDE
TO NEXT RESONATOR
INVENTOR,
GEORGE L. MATTHAEI
BY Harry M. Saragovitz
Edward J. Kelly, Herbert Berl &
Julian C. Keppler
ATTORNEYS ed States Patent Office
3,428,922
Patented Feb. 18, 1969

3,428,922
MODE TRAP BAND-PASS FILTERS
George L. Matthaei, Santa Barbara, Calif., assignor to the United States of America as represented by the Secretary of the Army
Filed Oct. 9, 1964, Ser. No. 402,979
U.S. Cl. 333—73  3 Claims
Int. Cl. H03m 7/10; H01h 7/10

ABSTRACT OF THE DISCLOSURE

Cavity-type band-pass filters for use in waveguide systems are disclosed. The filter consists of one or more resonators. Each resonator is a half-wave length long and has iris plates at each end. A mode-trap plate having a hole through the center is placed in the center of each resonator. The outer perimeter of the space between the iris plates is sealed with a lossy material. The filter is capable of providing high Q circular $TE_{011}$ mode resonance to yield a good pass band while suppressing all other mode resonances that could occur in the usual forms of $TE_{011}$ mode resonators. The resonators disclosed are most easily driven by cylindrical terminating guides carry the circular $TE_{01}$ mode; however, rectangular guides can also be used.

---

This invention relates to waveguide filters and more particularly to cavity-type band-pass filters for use in waveguide systems.

Most cavity-type band-pass filters have additional pass bands at frequencies that are, roughly, multiples of the primary pass-band frequency. In addition, numerous other spurious responses may occur because of resonances involving higher-order transverse field variations. Furthermore, in many filter applications, it is desirable to use cylindrical cavities operating in the circular $TE_{01}$ mode, because of the higher Q and power-handling ability this mode affords. However, cavities operating in this mode tend to be especially plagued by unwanted resonances. Relatively large high-Q cavities are essential for narrow-band filters; for this reason, band-pass filters that can eliminate signal components close to the desired fundamental frequency have in the past been unsuitable for suppressing higher-order harmonic signals, because the large, multi-mode cavities give rise to many spurious resonances. The novel filter to be discussed shows considerable promise of avoiding this difficulty, so that a single filter might be used to suppress all emissions outside the desired frequency band.

An object of this invention is to provide a band-pass filter having an unusually broad upper stop band which is free of spurious responses.

A further object is to provide a cylindrical cavity, high Q filter which has a high power handling ability and is relatively free from unwanted resonances.

A still further object of this invention is to provide a circular cavity type band-pass filter which eliminates signal components close to the desired fundamental frequency but suppresses higher order harmonic signals.

Another object is to provide a multiple resonator mode-trap filter which is capable of giving a high Q, circular $TE_{011}$ mode resonance to yield a good pass band, but in which most other mode resonances that could occur in the usual forms of $TE_{011}$ mode cylindrical resonators are heavily damped or nonexistent.

Other features, objects and advantages will become apparent from the following specification when read in connection with the accompanying drawings in which:

FIG. 1 is a cross-section of a three resonator version of the proposed filter,

FIG. 2(a) is a front view of an iris plate which forms the walls of the resonators of FIG. 1, FIG. 2(b) is a front view of a mode trap plate, FIG. 3 is an enlarged sketch of the center portion of a mode-trap resonator, FIGS. 4(a) through 4(d) are two annular iris configurations for possible use in the iris plates of the filter of FIG. 1, FIGS. 4(b) and 4(d) being cross-sections of FIGS. 4(a) and 4(c) respectively, and FIG. 5 is a waveguide configuration which permits connection of the filter of this invention to a rectangular waveguide.

Referring now to FIG. 1 there is shown a filter 10 comprising three resonators 11, 12 and 13 connected to circular waveguides 14. This version of the filter uses resonators composed of iris plates 15 having iris slits 16 as shown in FIG. 2(a), alternating with mode-trap plates 17 having holes 18 in the center thereof as shown in FIG. 2(b). The iris plates 15 are spaced $\lambda_{g0}/2$ apart at the pass-band frequency; they form the end walls of each resonator and provide the iris couplings between resonators 11, 12 and 13 of FIG. 1. A mode-trap plate is placed at the center of each resonator, halfway between the iris plates, while the outer perimeter of the region between the iris plates and mode-trap plates is filled with lossy material 19 to provide a load for any energy that may be radiating out between the plates. At the desired resonance, the resonators have a field configuration that is similar to that in a cylindrical resonator operating in the circular (or cylindrical) $TE_{011}$ mode. This type of filter is called a "mode-trap" filter because most modes that might occur in such a structure are heavily damped out by the lossy material around the perimeter of the structure, while (for reasons to be hereafter explained) a circular $TE_{011}$ mode can be "trapped" in the center portion of the structure so that its energy cannot reach the lossy material. Thus, this structure is capable of giving a high-Q, circular $TE_{011}$ mode resonance in each resonator to yield a good pass band, but most other mode resonances that could occur in the usual forms of $TE_{011}$ mode cylindrical resonators are heavily damped or nonexistent.

Although this type of filter makes use of lossy load material within its structure, it is not a leaky-wave filter in the usual sense. In this filter the lossy material is used to damp out unwanted resonances. At frequencies where unwanted resonances are damped out, the input impedance to the filter will be essentially the reactance of the input coupling iris. Thus, the unwanted signal components are reflected by this filter rather than absorbed. The lossy material may be thought of as causing the coupling into the unwanted modes to be greatly mismatched so that, in fact, very little energy goes into the unwanted modes (and into the lossy material).

The reason that energy in a circular $TE_{011}$ mode will be trapped in the center portion of the resonators in FIG. 1 can be seen as follows. The E field for a circular $TE_{011}$ mode has the circular configuration indicated in FIG. 2(b). Thus, as is indicated in FIG. 3, the E field of the circular $TE_{011}$ mode is always parallel to the metal plates that form the resonator. The metal plates form a radial transmission-line structure, and it is known that such a radial transmission-line structure is cut off to radiation having the E-field vector parallel to the plates, unless the plate spacing is a half wavelength or greater. In this case the plate spacings are roughly a quarter wavelength at the pass-band frequency, so that the $TE_{011}$ mode energy cannot escape between the plates.

Although $TE_{011}$ mode energy is trapped by the radial transmission lines formed by the metal plates, all TM modes present will have a component of E field that is perpendicular to the plates, as indicated in FIG. 3. Radial lines have no cutoff frequency for energy having its E field perpendicular to the plates, so that all TM modes will cause propagation out to the lossy material, and such modes will be heavily damped. Of course, other TE modes besides the $TE_{011}$ mode might exist. The radial lines would be cut off to the energy of such modes, up to frequencies where the plates are spaced by a half wavelength or more. However, all TE modes in cylindrical cavities, except for $TE_{omn}$ modes, require longitudinal wall currents to flow (the $TE_{011}$ mode has only circumferential wall currents). Since no longitudinal currents can flow in the structure in FIG. 1 (i.e., since there are no conductors that permit currents to flow from left to right in FIG. 1 and back) it appears that all TE modes except the $TE_{011}$ mode will also tend to be suppressed, at least to some degree. At the second or higher harmonics of the primary pass-band frequency, the metal plates are spaced a half wavelength or more apart, so that even the $TE_{012}$ mode is no longer trapped in the structure, and all of the more probable modes should be heavily loaded by the lossy material around the perimeter of the plates. In this manner, elimination of substantially all of the unwanted resonances that commonly occur in a circular $TE_{011}$ mode resonator is possible.

Elongated slots such as are shown in the iris plate 15 in FIG. 2(a) tend to generate a small component of electric field in a direction perpendicular to the plane of the metal iris plate. Thus, even if the slots 16 in FIG. 2(a) are driven in a time phase with respect to each other so that the circular $TE_{01}$ mode is generated with maximum efficiency, there is still a small amount of energy present with the electric vector perpendicular to the plane of the iris plates, and this energy will easily radiate out between the plates to the lossy load material. This small leakage of energy degrades the unloaded Q of the resonator (to about 2600) at its primary resonance.

To eliminate the problem discussed above, the annular iris in FIGS. 4(a) and 4(b) was developed. This iris comprises an annular slot 26 which is filled with a dielectric material. This embodiment gives rise to much less leakage, as is evidenced by a much higher unloaded Q, i.e., around 6,400.

Another improvement made to the iris plate is the raised annular iris shown in FIGS. 4(c) and 4(d). In this embodiment a metal iris plate 35 has a hole 34 in the center thereof. A dielectric member 36 is located on the iris plate over the hole 34. Due to the presence of the dielectric member, a metal center disc 37 which is located on the dielectric is spaced from the hole 34. The raised annular iris has many of the same properties of the planar annular iris, but having the metal center disk 37 raised from the plane of the iris plate 35 may have some advantage in that it may help to guide the energy in unwanted modes out to the lossy load material at the perimeter of the resonator. The sizable disk of dielectric material shown was found to be desirable from the standpoint of increasing the coupling of the iris without having to raise the center metal disk an unreasonable amount. The dielectric material should also help to guide energy at high frequencies to the load material at the perimeter of the resonator. At the fundamental resonance the dielectric material is in a region of relatively low electric field so that the dielectric losses should not be large. This is especially true if materials are used, which have dissipation factors of less than 0.0001.

The mode-trap resonators under discussion are most easily driven by cylindrical terminating guides carrying the circular $TE_{01}$ mode. However, these resonators can also be made use of when the driving system uses rectangular guide. FIGURE 5 shows what is probably the easiest method for obtaining from a rectangular guide system the circular $TE_{01}$ mode driving signal that is required in order to excite properly a mode-trap resonator at its fundamental resonance. The circuit shown uses a conventional cylindrical $TE_{011}$ mode resonator 41 as a transducer for obtaining the desired circular $TE_{01}$ mode exciting fields. The $TE_{011}$ mode resonance in the cylindrical resonator 41 is excited by a longitudinal slot 42 in the end wall of the rectangular input guide 43. Using this approach, a multiresonator filter might use a conventional $TE_{011}$ mode cylindrical resonator at each end, and mode-trap resonators in the interior of the filter. The cylindrical and the mode-trap resonators would then all contribute to the sharpness of the cutoff adjacent to the pass band, while the mode-trap resonators would help to ensure a broad stop band that is free of unwanted pass bands.

The resonator of FIG. 5 uses a tuning plunger 44 that does not make contact with the side walls of the cavity. This is feasible, of course since the wall currents in $TE_{011}$ mode resonators are all circumferential in direction. In addition, many spurious modes in this type of cavity can be reduced in strength by adding some lossy material behind the tuning plunger.

What is claimed is:

1. A mode-trap resonator which permits resonance in the $TE_{011}$ mode while damping most other resonances comprising:
    a pair of parallel conductive iris discs spaced a half wavelength apart, each of said iris discs having a hole in the center thereof, a dielectric disc located over said hole and extending a short distance beyond said hole and a metal disc located on the side of said dielectric disc opposite said hole and being aligned therewith;
    a circular conductive mode-trap disc interposed between and being parallel to said iris discs, said mode-trap disc having a hole in the center thereof to permit the $TE_{011}$ mode to exist therein;
    a lossy material placed along the outer perimeter of the region between said iris discs and said mode trap disc; and
    means adjacent said discs for coupling energy between said resonator and external circuits.

2. A cavity-type band pass filter comprising:
    a plurality of parallel conductive iris discs, each of said iris discs having a hole in the center thereof, a dielectric disc located over said hole and extending a short distance beyond said hole and a metal disc located on the side of said dielectric disc opposite said hole and being aligned therewith;
    a circular conductive mode-trap disc interposed between and being parallel to each adjacent pair of said iris discs, said mode-trap discs having a hole in the center to permit the $TE_{011}$ mode to exist therein;
    a lossy material placed along the outer perimeter of the region between said iris discs and said mode-trap discs; and
    coupling means adjacent the outermost two of said iris discs for coupling energy into and out of said filter.

3. The filter as set forth in claim 2 in which said coupling means comprises a $TE_{011}$ mode cylindrical resonator; a movable plunger at the bottom of said cylindrical resonator, the top thereof being adjacent one of said outermost iris plates; a longitudinal slot in the side of said resonator;

and a rectangular waveguide connected to said cavity so that said slot is within the end of said waveguide.

References Cited

UNITED STATES PATENTS

| | | | |
|---|---|---|---|
| 3,184,695 | 5/1965 | Unger | 333—98 |
| 2,151,118 | 3/1939 | King. | |
| 3,085,213 | 4/1963 | Walker | 333—7 |
| 3,153,767 | 10/1964 | Kyhl | 333—31 |
| 3,008,102 | 11/1961 | St. Clair. | |
| 3,221,205 | 11/1965 | Sensiper | 315—3.5 |
| 3,259,903 | 7/1966 | Lerner | 333—95 |

HERMAN KARL SAALBACH, *Primary Examiner.*

C. BARAFF, *Assistant Examiner.*

U.S. Cl. X.R.

333—21, 98, 83